United States Patent [19]

De Montmorency

[11] Patent Number: 4,465,430
[45] Date of Patent: Aug. 14, 1984

[54] GUIDE CASE

[76] Inventor: David G. De Montmorency, 276 Blair Rd., Cambridge, Ontario, N1S 2K1, Canada

[21] Appl. No.: 373,189

[22] Filed: Apr. 29, 1982

[30] Foreign Application Priority Data

Aug. 6, 1981 [CA] Canada .................................. 383290

[51] Int. Cl.³ ............................................. F04D 29/40
[52] U.S. Cl. .................................... 415/205; 415/203; 415/219
[58] Field of Search .................... 415/203, 205, 219 R

[56] References Cited

U.S. PATENT DOCUMENTS

| 340,120 | 4/1886 | Hussey | 415/203 |
| 2,410,810 | 11/1946 | Cronstedt | 415/219 R |
| 2,773,666 | 12/1956 | Martin | 415/205 |

FOREIGN PATENT DOCUMENTS 275236  8/1951  Switzerland ..................... 415/205

Primary Examiner—Stephen Marcus
Assistant Examiner—John Kwon
Attorney, Agent, or Firm—Rogers, Bereskin and Parr

[57] ABSTRACT

A guide case is shown, for imparting a helical swirling motion to a flow of fluid, e.g. water, that is about to enter a turbine or propellor, for a small hydro-electricity generator. The case provides high turbine efficiency over a wide range of conditions, yet is compact, has no moving parts, and is easy to make from sheet metal. The case has an annular chamber into which an inlet duct feeds tangentially. As the water rotates around the annulus, it is conveyed axially along the chamber by a helical end of the chamber, arranged analogously to a square screw thread. The lead of the helix is such that there is neither interference nor a gap between water entering the chamber and water that has completed a revolution around the chamber.

11 Claims, 6 Drawing Figures

GUIDE CASE

This invention relates to guide cases for imparting a helical swirl to a flowing fluid. Such cases are used for example to receive a flow of water and to discharge the water into a duct containing an axial flow turbine or propellor, the helical swirl enhancing the efficiency of the propellor.

To provide the helical swirl, guide cases containing vanes have been used. Whilst vanes are efficient enough when the fluid strikes exactly in line with the vanes, if the direction of the fluid is such that the fluid has even a slight component of velocity across the vanes, then efficiency is lost due to the induced eddies and vortices. Thus, vanes are efficient only over a narrow range of operating conditions. Feathering the vanes can improve the range, but only at great expense if the feathering mechanism is to be reliable.

Another way of providing the helical swirl has been the use of scroll cases. These cases receive the fluid generally tangentially, and feed the fluid around a spiral tube of gradually reducing section. Such cases can be efficient over a wide operating range, but they are expensive to provide, and occupy a good a good deal of space.

A turbine intended primarily for domestic electricity generation from a river or stream should be cheap to produce, have no moving parts for reliability, and should be efficient over a wide range of operating conditions, particularly of flow-rate and of load on the turbine.

An object of the invention is to provide a guide case which imparts the desired helical swirl by virtue of its shape as a whole case, rather than as a series of vanes.

Another object is to provide a guide case that can be made of sheet metal, simply bent into shape and welded together.

The invention will now be further described by way of example with reference to the accompanying drawings in which:

FIGS. 1 to 6 are different views all of a guide case 11 which embodies the invention.

Figure 1:
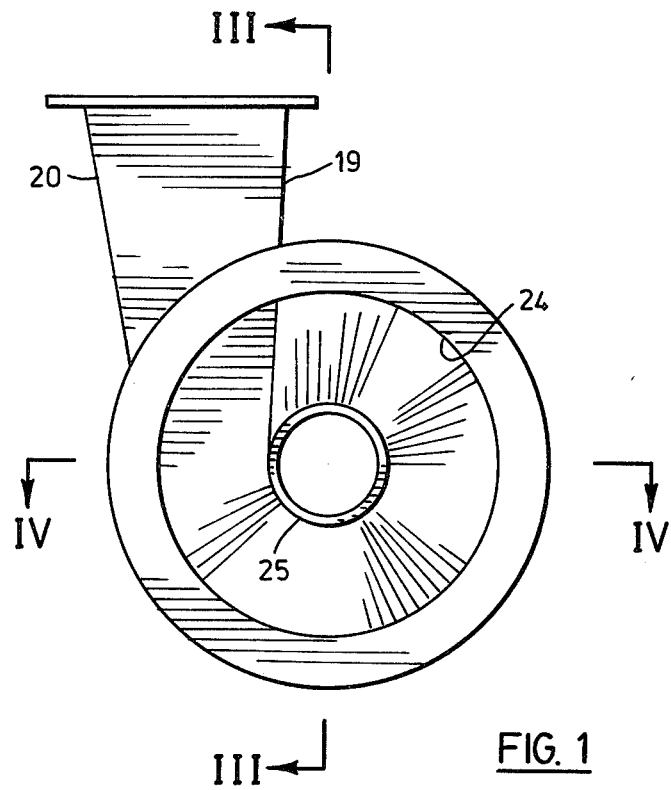
FIG. 1 is an end elevation of a guide case which embodies the invention.
Figure 2:
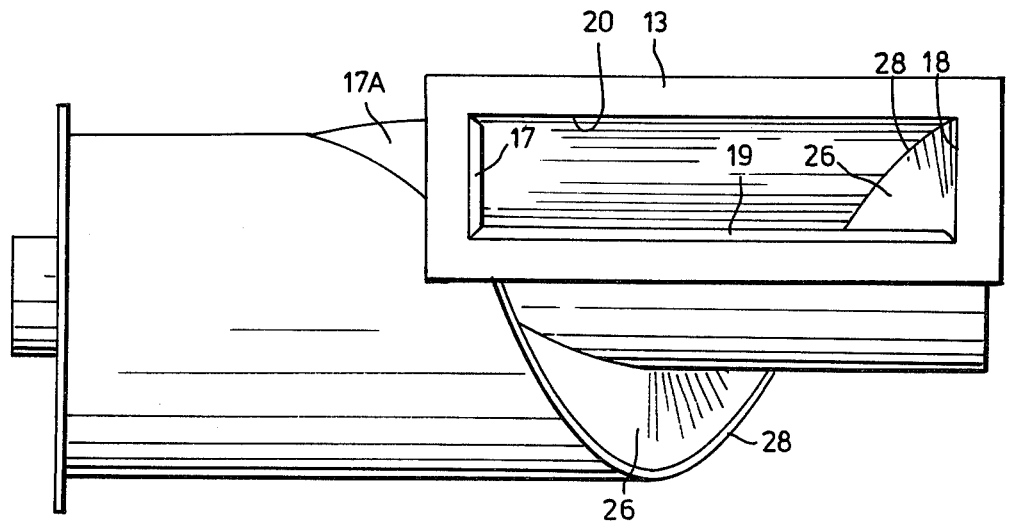
FIG. 2 is a plan of the case of FIG. 1.

The case has a water inlet hole 12 defined by an inlet flange 13, and a water outlet hole 14, defined by an outlet flange 15.

The inlet hole 12 leads into a rectangular inlet duct 16, having relatively short front 17 and back 18 walls, and relatively long inner 19 and outer 20 walls.

The outlet hole 14 leads from an outlet duct 21 which extends from one axial end 22 of a chamber 23 of annular configuration defined by an outer tube 24 and an inner tube 25. From FIG. 1 particularly, it can be seen that the inner wall 19 is tangential to the inner tube 25, whilst the outer wall 20 is tangential to the outer tube 24. The walls 17, 18 are joined to the respective tubes 24, 25 in a smooth, blending tangential manner.

Figure 5:
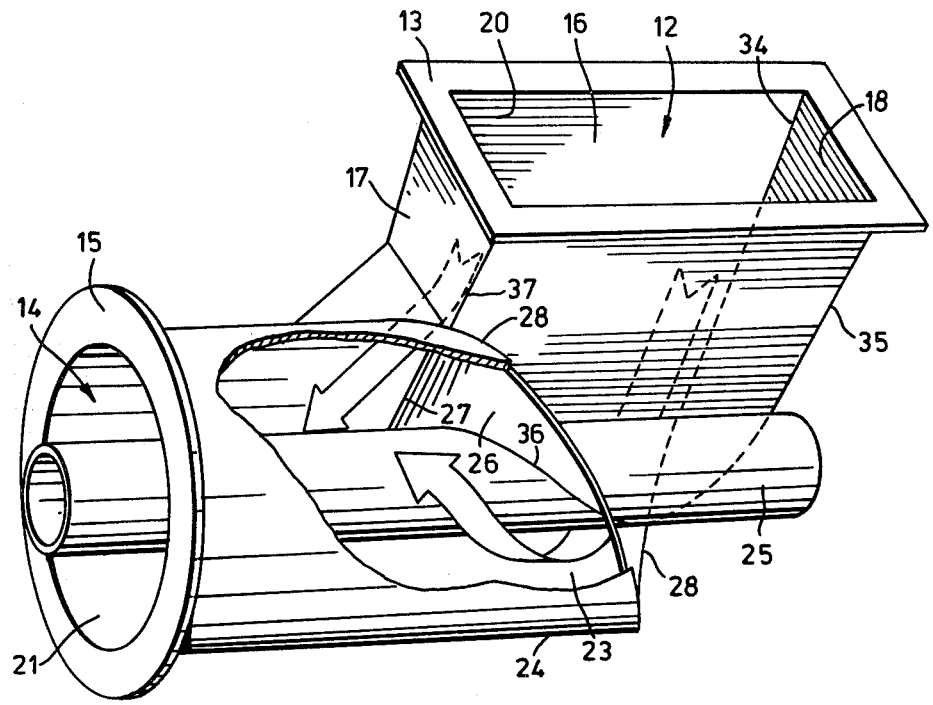
FIGS. 5 and 6 are pictorial views of the case of FIG. 1.
Figure 6:
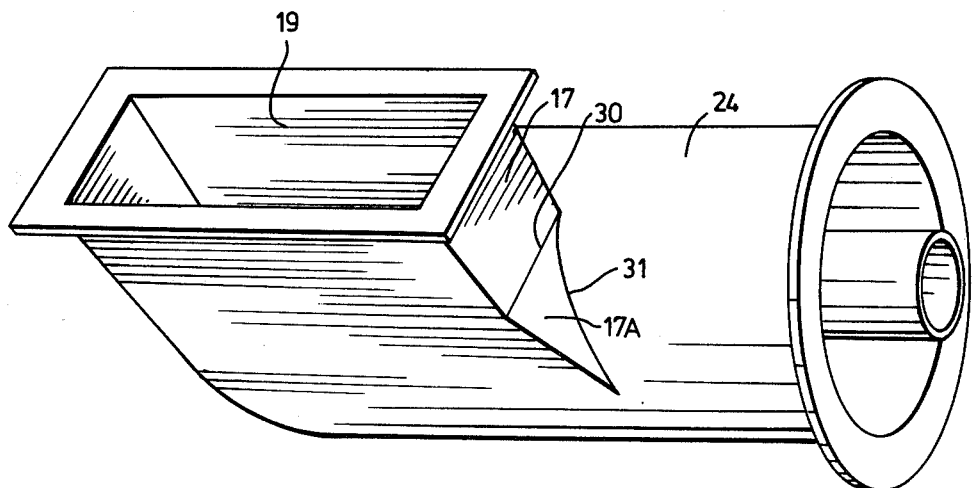

Formed around the inner tube 25 is a helical wall 26. The shape of the wall 26 is analogous to that of a square thread (i.e. a thread whose flanks are radial) based on the inner tube 25. The helical wall 26 is a continuation of the back wall 18 of the inlet duct 16: FIG. 5 particularly illustrates the continuity between the helical wall 26 and the back wall 18.

The helical wall 26 extends around and along the inner tube 25, square to the tube, and ends at the edge 27 where the wall 26 meets the inner wall 19. The angle of the helix to which the wall 26 is formed is chosen so that the wall 26 continues from the back wall 18, up to the edge 27. The outer tube 24 is formed with a helical end, complementary to the helical wall 26, and is joined to the wall 26 to form helical edge 28. The chamber 23 is thus closed and sealed at its end 29 opposite the end 22 by the helical wall 26.

The front wall 17 has a bend 30, the portion 17A of the front wall below this bend joining the outer tube 24 to form an edge 31. The angle at which the front wall 17 is bent at 30 is chosen so that the edge 31 is a smooth continuation of the helical edge 28.

In use, a turbine or propellor 32 is positioned in line with the outlet hole 14. The propellor 32 is fixed to a shaft 33 mounted in bearings in the inner tube 25. The other end of the shaft 33 drives an electrical generator or other desired load. Water is fed into the inlet hole 12 and emerges from the outlet hole 14 to drive the propellor 32.

Water that enters the hole 12 close to the back wall 18 travels down the back wall 18, and then starts to travel along the helical wall 26. The water near the edge 34 between the back wall 18 and the outer wall 20 remains near the edge 28 as it travels along the wall 26, and the water near the edge 35 between the back wall 18 and the inner wall 19 remains near the junction 36 between the helical wall 26 and the inner tube 25 as it travels along the wall 26.

Thus, by the time the water that entered near the back wall 18 has travelled nearly completely round the annular chamber 23, that water has travelled also axially along the chamber 23 a distance that is substantially equal to the axial length of the inner wall 19 of the inlet duct 16. Therefore, there is substantially no interference between the water that has been round the chamber 23 with water that is just entering the chamber 23. The water flows smoothly, without interfering with itself, without sudden changes in velocity, and without having to pass through passages having abrupt changes in section, over a very wide range of conditions.

The guide case illustrated is mounted with the axis of chamber 23, i.e. of the tubes 24, 25 horizontal, and the hole 12 facing upwards. However, the case may be mounted in any convenient orientation.

Figure 3:
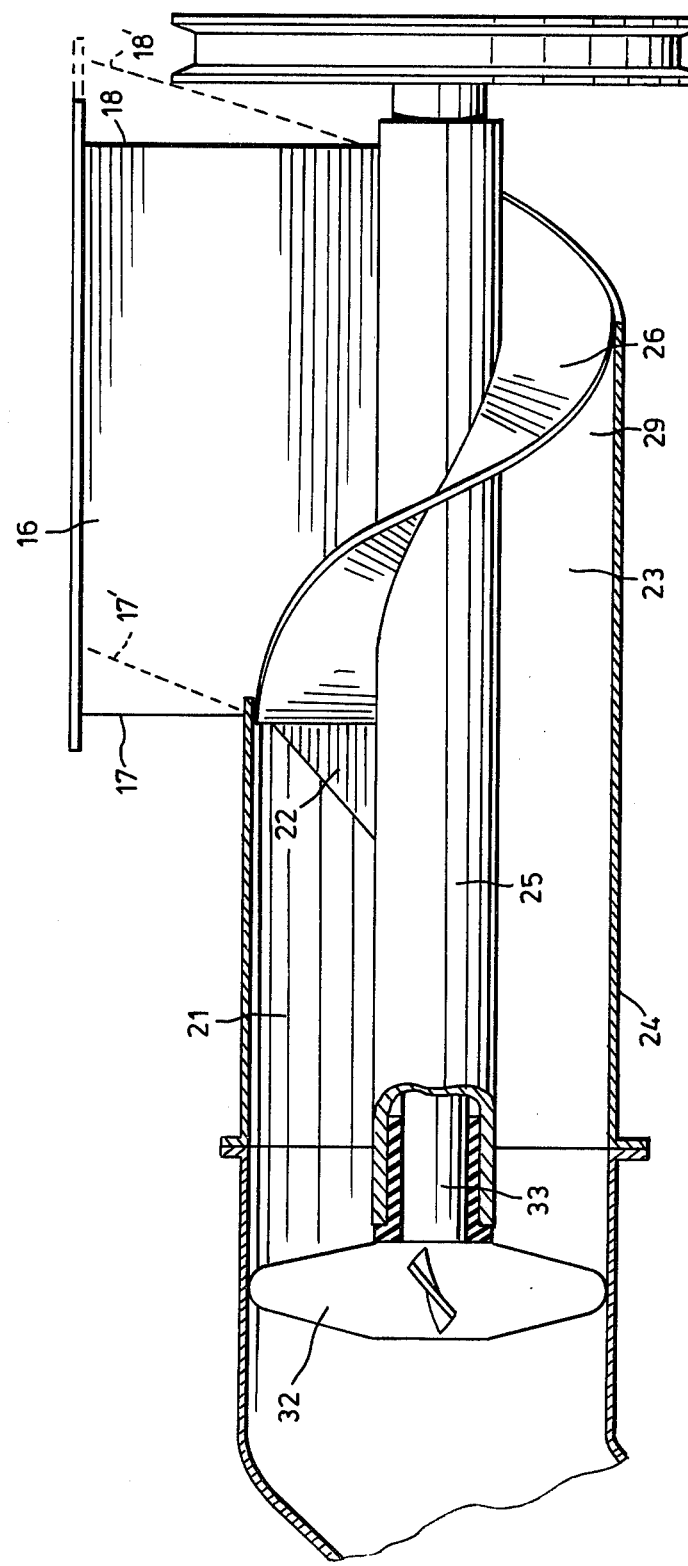
FIG. 3 is a section on line III—III of FIG. 1, showing the case in an installation.
Figure 4:
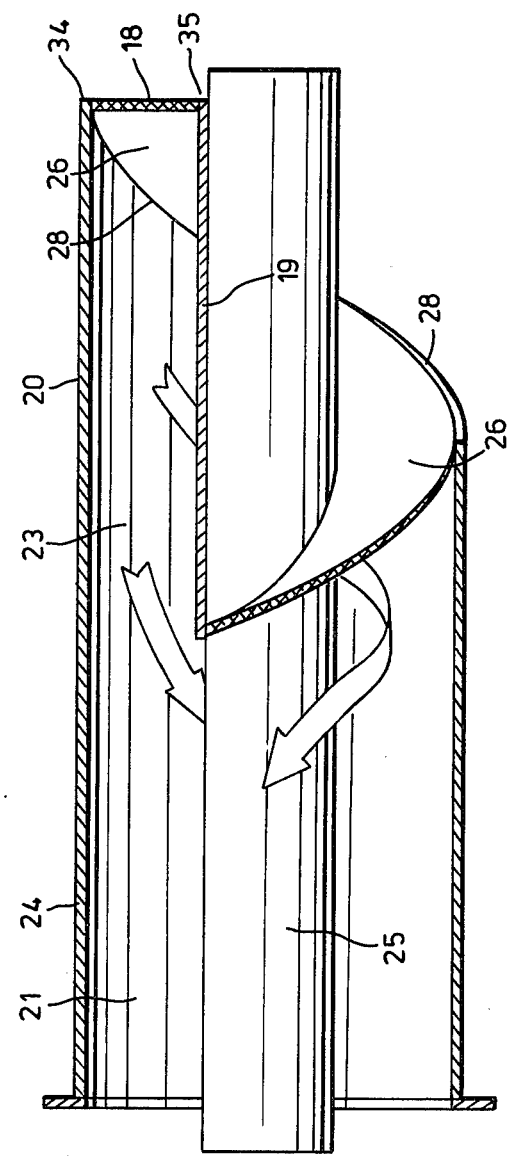
FIG. 4 is a section on line IV—IV of FIG. 1.

The back wall 18 and front wall 17 of the inlet duct 16 are substantially at right angles to the axis. Thus water entering the inlet duct 16 has substantially no component of velocity in the axial direction, until the direction of travel of the water is affected by the presence of the helical wall 26. It may be more convenient in some cases to angle the front and back walls of the inlet duct relative to the axis substantially at the helix angle of the helical wall 26. Front and back walls so angled are shown at 17', 18' in FIG. 3. Here, the front and back walls are still normal to a plane through the axis and parallel to the inner and outer walls 19, 20. The water entering the case then does have an axial component of velocity, so that the reaction against the wall 26, and hence the flow resistance, is smaller. The lower part 17A of the front wall 17 is angled in this manner in the solid line embodiment shown to ease the transition of water in the inlet duct 16 to the desired helical flow in the outlet duct 21. The front wall is shown sharply angled at 30, but in practice the bend would be a more gradual curve.

As pointed out above, the lead of the helix should be such that the wall 26 is joined to the inner wall 19 at the place 27 directly radially in line with the junction 37 between the inner wall 19 and the front wall 17. If the lead is smaller then the water that is entering at the front of the inlet duct will interfere with water that entered at the back which has already travelled around the case. If the lead is larger, then there will be a gap between water entering the inlet duct at the front and water that entered at the back which has already travelled around the case. Both interference, due to too small a lead, and a gap, due to too large a lead, would tend to break up the smooth flow of water through the case, and to produce inefficiencies.

The helical wall 26 ends at the edge 27 of the inner wall 19 in the guide case illustrated. However, the wall 26 could extend further along the outlet duct 21 towards the outlet hole 14, and such an extension could be useful if the propellor 32 has to be located some way beyond the hole 14, to ensure that the helical flow characteristic is maintained along the outlet duct 21 from the annular chamber 23 to the propellor 32.

The inlet duct 16 illustrated is rectangular, but it may be convenient to provide an inlet duct of some other shape; circular for instance. When the duct 16 is rectangular, the whole of the case 11 may be made from sheet material, which is easily cut and bent as shown and joined by, for example, welding. Other shapes of duct however impose the requirement for compound curves as the various walls blend with each other, which makes for difficult manufacture using sheet material. However, the expression "wall" in this specification is intended to cover not only a wall of flat or bent sheet material but also a curved wall moulded or otherwise shaped in material of other forms.

If the inlet duct is circular, then the lead of the helix may be advantageously less than the axial length of the inlet duct (which would in such a case be the diameter of the duct) since the mass flow of water would diminish at the axial extremities of such a circular duct. Therefore, some interference, as caused by having a shorter helical lead, would tend to even up any unevenness in the flow profile around the outlet duct.

As mentioned earlier, the helical wall 26 is square to the axis of the tubes 24, 25. This ensures that the tangential component of the velocity of the water at a particular radius is substantially proportional to that radius, which is normally the desired characteristic. However, other velocity profiles can be produced, if desired, by tilting the wall 26, either positively or negatively inclined away from the square.

Instead of just the one inlet hole 12 as in the guide case illustrated, there may be more than one. The inlet holes may be positioned symmetrically around the circumference of the tubes. Instead of just one helical wall, there should be as many walls as inlet holes; the layout of the helical walls now being analogous to a multi-start thread, as distinct from the single-start thread that is analogous to the single wall illustrated. The requirement that the lead of the helix should be chosen so that the helical wall 26 meets the front wall end 37, 27 of the inner wall 19, still applies however, if the inlet duct is rectangular.

The guide case of the invention is advantageous in providing not only a smooth, efficient, flow of water, but in providing a robust, cheap mounting means for the turbine. The absence of moving parts in the guide case means that the inner tube 22 may be rigidly supported except at the outlet end of the case 11 so that the propellor shaft 33 is firmly supported along its length, with little overhang. Furthermore, the guide case imposes little restriction on access to the propellor for servicing purposes, since the shaft simply passes straight through the case.

The junctions between the various walls and tubes of the case are preferably smooth and blend or merge together in a manner that provides a minimum interference with the smooth flow of water at the junction.

It may be regarded that the rectangular body of water entering the inlet hole 12 becomes an annular body upon emerging from the outlet 14, albeit with the helical motion superimposed. This may be visualized by considering that thie inlet duct is twisted to form an annulus by bending the front and rear walls 17, 18 around together until they meet. Thus the width of the inlet 12 becomes the radial width (i.e. the annulus thickness) of the outlet 14. Similarly, the axial length of the inlet may be regarded as the circumferential length of the outlet.

The area of the inlet duct may be made larger than the area of the outlet duct 21, if it is required that the water emerges at a higher speed than it entered. This is accomplished by making the width of the inlet larger than the annular width of the outlet, as shown in FIG. 1. The side plate 20 tapers toward side plate 19.

The height of the inlet and hence the lead angle may be changed to impart more or less swirl on the water in the annulus. Shorter side plates 19 and 20 would give a shorter lead on the helix and the fluid would have a relatively greater tangential component. In this manner the tangential and axial components of flow in the outlet 21 can be adjusted to suit the characteristics of the propeller 32.

I claim:

1. Guide case, for receiving a flow of fluid in an inlet duct for discharging the fluid from an outlet duct, and for imparting to the discharged fluid a helical component of motion, comprising:
    fixed inner and outer tubes defining between them an annular chamber, one axial end of which comprises the outlet duct;
    fixed inner, outer, front and back walls, defining an inlet duct, with the inner and outer walls being parallel to the axis of the chamber, and merging smoothly tangentially with the inner and outer tubes respectively; and
    a fixed helical wall, merging smoothly with the back wall, extending radially between the tubes, and disposed helically along the tubes, and defining and sealing off the other axial end of the annular chamber.

2. Guide case as claimed in claim 1 wherein the front and back walls include portions normal to a plane extending through the axis parallel to the inner and outer walls.

3. Guide case as claimed in claim 2 wherein the inlet duct is rectangular.

4. Guide as claimed in claim 1, having only one inlet duct.

5. Guide case as claimed in claim 3, wherein the inner and outer walls are substantially much longer than the front and back walls.

6. Guide case as claimed in claim 3, wherein the helical wall is formed to a helix, the lead of which is such that the helical wall joins the inner wall substantially at the place along the axis of the chamber, that is defined by the junction between the inner wall and the front wall.

7. Guide case as claimed in claim 1, wherein the helical wall is formed square to the axis of the chamber.

8. Guide case as claimed in claim 7, wherein the case is made of sheet material, formed substantially without compound curves.

9. Guide case as claimed in claim 3, wherein at least a portion of the front wall is angled with respect to the axis, substantially at the helix angle.

10. Guide case as claimed in claim 1;
having only one inlet duct;
the inlet duct being rectangular;
the inner and outer walls being substantially much longer than the front and back walls;
the lead of the helix of the helical wall being such that the helical wall joins the inner wall substantially at the place along the axis that is defined by the junction between the inner wall and the front wall;
the helical wall being formed square to the axis;
the case being made of sheet material, formed substantially without compound curves;
at least a portion of the front wall being angled with the respect to the axis substantially at the helix angle.

11. Guide case as claimed in claim 10, wherein a turbine or propellor is positioned in line with the outlet duct, and is attached to a drive shaft disposed axially along the inner tube.

* * * * *